UNITED STATES PATENT OFFICE.

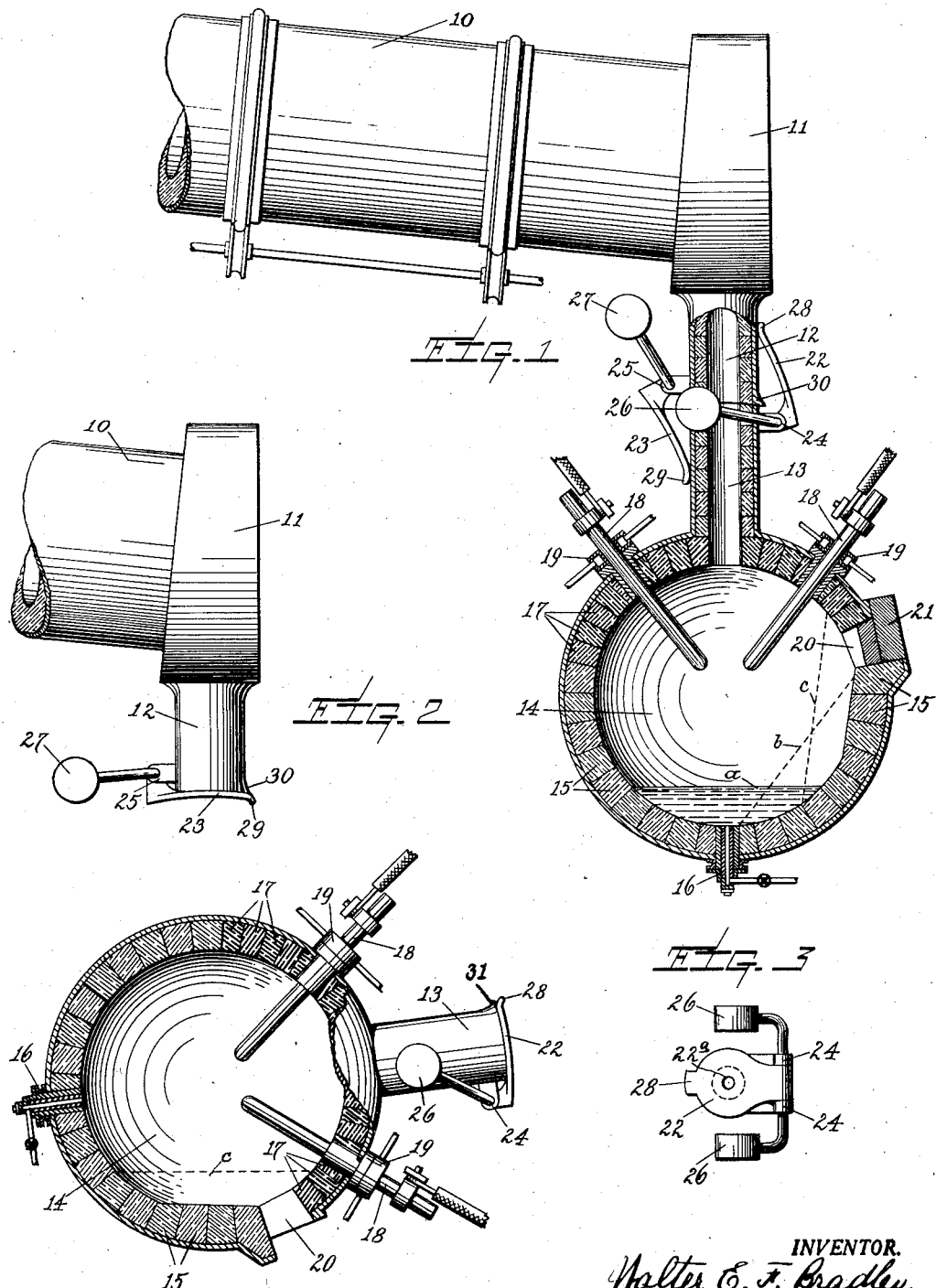

WALTER E. F. BRADLEY, OF LOS ANGELES, CALIFORNIA.

FURNACE-FLUE CLOSURE.

1,411,157.   Specification of Letters Patent.   Patented Mar. 28, 1922.

Application filed July 5, 1919, Serial No. 308,702. Renewed August 26, 1921. Serial No. 495,719.

*To all whom it may concern:*

Be it known that I, WALTER E. F. BRADLEY, a citizen of the United States, a resident of Los Angeles, county of Los Angeles, and State of California, have invented certain new and useful Improvements in Furnace-Flue Closures, of which the following is a specification.

The invention relates in general to furnaces for metallurgical operations and more particularly to a system in which an electric furnace is employed for metallurgical reduction in conjunction with a rotary drum in which the charge of the materials is preheated and may perhaps be subjected to a preliminary partial reduction by the gases coming from the electric furnace, into which the rotary drum delivers the charge. It will be understood that in such systems the charge is preferably in the form of finely divided ore with which may be incorporated a flux and which may also contain the reducing agent in the form of carbon. The term ore is used in a broad sense to include any material which is to be treated whether in a form of values and gangue or a concentrate or other form of raw material. The particular nature of the charge is not in itself of particular consequence so far as the features of novelty in the present invention are concerned, and I refer to the above only as examples. The reducing agent may be supplied with the charge of material as above suggested, or it may be separately supplied in the electric furnace, as for example through a tuyere which is submerged beneath the molten charge during the reducing operation and raised above the level of the molten charge at the completion of the reducing step and during the pouring of the slag or metal from the electric furnace.

I prefer to employ carbon electrodes and this same material, when used as a substance of which to construct the roof of the electric furnace, permits the attainment of high temperatures and furnishes a good medium for reflecting or radiating heat into the charge. During the normal running of the furnace, the interior space may readily be closed to the atmosphere so that the electrodes and roof as well as the reduced metal will be protected from oxidation by the reducing atmosphere coming from the reduction of the metal compound. The hot gases pass upwardly from the electric furnace and over the charge of incoming ore in the rotary drum. Preheating and preliminary partial reduction of the ore may thus occur. When, however, the electric furnace is swung or tilted to raise the tuyere above the level of the molten charge, or for pouring off slag or reduced metal, the electric furnace flue is disconnected from the discharge mouth of the rotary drum so that unless special precaution is taken, a rapid current of outside air may be drawn into the furnace and rapidly oxidize the highly heated carbon of the electrodes and roof not to mention the cooling of the interior and the contained charge. I therefore provide a closure for automatically shutting off the flue leading from the electric furnace at the moment of its disconnection from the discharge mouth of the rotary drum. Preferably a similar closure is applied to the discharge mouth of the rotary drum to exclude the outside air therefrom at the same time.

To more clearly explain the principles of the invention, reference may be had to the accompanying drawing.

In said drawing;

Figure 1 is a diagram partly in vertical section illustrating a system comprising a rotary feed drum and electric furnace connected therewith, to which the flue closures are applied.

Figure 2 is a similar diagram with the electric furnace tilted into a pouring position and disconnected from the rotary feed drum, with the flues closed.

Figure 3 is a top plan view showing the disposition of the flue closure parts.

Referring more specifically to said drawings, 10 indicates the rotary feed drum which is assumed to be supplied with finely divided material in any approved manner. The stationary head 11 of the rotary drum 10 receives the charge material from drum 10 and discharges it through the discharge mouth 12 into the flue 13 of the electric furnace 14. Electric furnace 14 may be regarded as comprising the hearth 15 through which leads a tuyere 16 for the introduction of a gaseous reducing agent such, as, for example, natural gas or some other hydrocarbon gas. The precise nature of this reducing gas is not directly material to the broader features of the present invention. The carbon roof of the electric furnace is indicated at 17 and the carbon electrodes at 18. These electrodes are suitably insulated from the material of the roof and they may have the usual cooling jackets 19. The construction illustrated assumes an electric furnace of the swinging or tilting type, and is shown as being provided with the pour-out door 20 which may be normally closed by block 21, of suitable refractory material. According to the present invention, the flue 13 and the discharge mouth 12 are provided with closures 22, 23 which may be hinged at 24, 25 and counter-weighted at 26, 27 so that upon disconnecting the flue 13 from the discharge mouth 12 the counter-weights 26, 27 will operate to swing the closure 22, 23 into position across their respective passages, thereby shutting off or preventing the draft of air which would otherwise be admitted when these parts are disconnected. Upon return of the parts to normal position, the inclined or curved lips 28, 29 of the flue closures contact with the deflectors 30, 31 and the closures are thereby swung open to permit the delivery of the charge into the electric furnace and the exit of gases therefrom, as before.

The normal position of the molten charge is indicated at $a$. When the furnace is tilted or swung to withdraw the tuyere from below the charge, the level may be as indicated at $b$. Finally, when pouring, the level may be at $c$. When the furnace is tilted into the position represented by the charge level $b$, it will be understood that the supply of reducing gas may safely be considerably cut down to an amount just sufficient to maintain the reducing atmosphere inside the furnace, as the tuyere is no longer submerged and would thus not be subject to having the charge run into it. This intermediate position may be employed for example when introducing admixtures for making steel or alloys and also gives an opportunity for bubbles of the reducing gas or gaseous products to escape.

The introduction of a reducing gas through the tuyere is of particular importance in connection with the carbon roof, as this construction provides a convenient means for maintaining a reducing atmosphere within the furnace, even after the reduction of the ore is completed. It thus makes the use of carbon for the construction of the roof a practical expedient for operating the furnace at higher temperatures than would be permissible with the materials commonly employed. A small orifice $22^a$ may be provided in the closure 22 so as to prevent the gas from being forced out through the pour out door, during the pouring operation.

I claim;

1. Apparatus of the character described comprising in combination a furnace having a flue through which the charge is introduced, means normally connected with said flue for delivering the charge therethrough, and means for automatically closing said flue upon disconnecting the same from said delivery means.

2. Apparatus of the character described comprising in combination an electric furnace having a flue through which the charge is introduced and gaseous products discharged, a feed device adapted to be normally connected with said flue for delivering the charge therethrough and receiving gaseous products therefrom, and means for automatically closing said flue upon disconnecting the same from said feed device.

3. Apparatus of the character described comprising in combination an electric furnace having a charge removal door and a charge receiving flue, a charge feeding means adapted to be normally connected with said flue for delivering the charge thereto and receiving gases therefrom, and means for automatically closing said flue upon disconnecting the same from said feeding means.

4. Apparatus of the character described comprising in combination an electric furnace of the swinging or tilting type having a pour out door and a flue for receiving the charge and discharging hot gases, a rotary feed drum adapted to be normally connected with said flue for delivering the charge thereto and receiving the hot gases therefrom, and means for automatically closing said flue upon disconnecting the same from said feed drum.

5. Apparatus of the character described, comprising in combination an electric furnace having a flue through which the charge is introduced and gaseous products discharged, a charge supply means having a discharge mouth adapted to be connected with said flue to deliver charge thereto and receive hot gas therefrom for preheating and preliminary reduction, and means for automatically closing said flue and discharge mouth upon their being disconnected.

6. An electric furnace provided with a carbon roof; and means for maintaining a reducing atmosphere within the furnace during the removal of the charge.

7. An electric furnace having a carbon roof, and means for introducing a reducing gas into the furnace during the removal of the charge therefrom to protect the roof from oxidation.

8. An electric furnace having a carbon roof and provided with a charge receiving flue and pour out door; in combination with means for automatically closing said flue when pouring, to exclude a draft of outside air and protect the roof from oxidation.

9. Apparatus of the character described comprising in combination an electric furnace, having a pour out door and a charge receiving flue, a charge supply means adapted to be connected with and disconnected from said charge receiving flue, and means for automatically opening said flue when connecting it with said supply means and closing said flue when disconnecting it therefrom.

10. Apparatus of the character described comprising in combination a furnace for the reduction of ore, a charge feeding means therefor, having a discharge chute leading to said furnace and receiving hot gases therefrom to preheat and partially reduce the ore, means for connecting and disconnecting said furnace and said charge feeding means and means for automatically closing the said discharge chute upon disconnecting the furnace from the charge feeding means.

WALTER E. F. BRADLEY.